United States Patent
Foster

(10) Patent No.: US 9,554,241 B2
(45) Date of Patent: Jan. 24, 2017

(54) SYSTEMS AND METHODS FOR SHARING LOCATION DATA WITHIN A VEHICLE

(71) Applicant: GOOGLE INC., Mountain View, CA (US)

(72) Inventor: Andrew Foster, Naremburn (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/845,808

(22) Filed: Sep. 4, 2015

(65) Prior Publication Data

US 2016/0088422 A1    Mar. 24, 2016

Related U.S. Application Data

(60) Provisional application No. 62/054,184, filed on Sep. 23, 2014.

(51) Int. Cl.
| | |
|---|---|
| H04W 4/00 | (2009.01) |
| G01S 5/00 | (2006.01) |
| G01S 5/02 | (2010.01) |
| H04W 4/04 | (2009.01) |
| H04L 29/08 | (2006.01) |
| H04W 4/20 | (2009.01) |

(52) U.S. Cl.
CPC ............ H04W 4/008 (2013.01); G01S 5/0072 (2013.01); G01S 5/0263 (2013.01); H04L 67/12 (2013.01); H04W 4/046 (2013.01); H04W 4/20 (2013.01)

(58) Field of Classification Search
CPC .................................................. H04W 4/008
See application file for complete search history.

(56) References Cited

U.S. PATENT DOCUMENTS

| | | | |
|---|---|---|---|
| 6,954,648 B2 | 10/2005 | Usui | |
| 8,639,266 B2 | 1/2014 | Zelinka | |
| 2005/0277427 A1* | 12/2005 | Zhang | H04W 64/00 |
| | | | 455/456.1 |
| 2009/0005070 A1* | 1/2009 | Forstall | G01C 21/12 |
| | | | 455/456.1 |
| 2009/0079622 A1 | 3/2009 | Seshadri et al. | |

OTHER PUBLICATIONS

Lane et al., "Piggyback CrowdSensing (PCS): Energy Efficient Crowdsourcing of Mobile Sensor Data by Exploiting Smartphone App Opportunities," SenSys (2013).
Extended European Search Report for Application No. 15186075.6, dated Feb. 9, 2016.
International Search Report and Written Opinion for Application No. PCT/US2015/048785, dated Feb. 17, 2016.

* cited by examiner

*Primary Examiner* — Tuan H Nguyen
(74) *Attorney, Agent, or Firm* — Marshall, Gerstein & Borun LLP

(57) ABSTRACT

To determine the location of a portable device operating within a vehicle that is not in direct communication with the vehicle head unit, the portable device may detect an attached portable device which is directly connected to the head unit. Moreover, the portable device may send a request to the attached portable device for the current location of the vehicle. The attached portable device may then transmit the current location of the vehicle to the portable device, and the portable device may estimate its own location based on the current location of the vehicle.

20 Claims, 6 Drawing Sheets

SYSTEMS AND METHODS FOR SHARING LOCATION DATA WITHIN A VEHICLE

CROSS-REFERENCE TO RELATED APPLICATIONS

This application claims priority to provisional U.S. Application Ser. No. 62/054,184, filed on Sep. 23, 2014, entitled "Systems and Methods for Sharing Location Data Within a Vehicle," the entire disclosure of which is hereby expressly incorporated by reference herein.

FIELD OF THE DISCLOSURE

The present disclosure relates to geographic data and, more particularly, to sharing location data from a computing device embedded within a vehicle with a portable device operating within the vehicle.

BACKGROUND

Today, many portable devices or vehicle head units are capable of determining their respective locations using one or more of various locating techniques. For example, some portables devices and/or vehicle head units are equipped with a Global Positioning System (GPS) chip to determine the latitude, longitude, and elevation of the portable devices and/or vehicle head units based on signals received from several GPS satellites. Some portable devices and/or vehicle head units are instead (or additionally) capable of determining their respective locations using signals from fixed or semi-fixed terrestrial elements having known locations, such as fixed cellular infrastructure elements (e.g., cellular tower base stations), Wi-Fi access points (APs) or "hotspots," etc.

SUMMARY

To determine the location of a portable device within a vehicle that is not in direct communication with a vehicle head unit ("contained portable device"), the contained portable device may receive the location of the vehicle via another portable device in direct communication with the head unit ("attached portable device"). The contained portable device may then estimate its own location based on the location of the vehicle. In this manner, the contained portable device may determine its own location without receiving GPS signals. By not activating its own GPS, the contained portable device may save battery life and may receive higher quality location information via the head unit.

In particular, an example embodiment of the techniques of the present disclosure is a portable device including a communication interface to communicate with a peer portable device and a computing device embedded within a vehicle and via a first short-range communication link and a second short-range communication link, respectively, one or more processors coupled to the communication interface, and a non-transitory computer-readable memory storing instructions. When executed on the one or more processors, the instructions cause the portable device to: receive a positioning request from the peer portable device via the first short-range communication link, and transmit a request for location data to the embedded computing device via the second short-range communication link. The instructions further cause the portable device to receive, from the embedded computing device via the second short-range communication link, location data corresponding to a current location of the vehicle, generate an indication of a location of the peer portable device using the received location data and transmit the generated location to the peer portable device via the second short-range communication link.

Another embodiment of these techniques is a method for determining a location of a portable device. The method includes determining that the contained portable device is within a threshold distance of an attached portable device communicatively coupled to a computing device embedded within a vehicle, wherein the contained portable device communicates with the attached portable device via a first short-range communication link, and the embedded computing device communicates with the attached portable device via a second short-range communication link. The method further includes transmitting, to the attached portable device, a positioning request via the first short-range communication link. Additionally, the method includes receiving location data corresponding to a current location of the vehicle from the attached portable device, and estimating, the location of the portable device based on the location data.

Yet another embodiment of these techniques is a method for determining a location of a portable device. The method includes determining that a contained portable device is within a threshold distance of an attached portable device which is communicatively coupled to a computing device embedded within a vehicle, and transmitting, to a remote computing device, a positioning request for a location of the attached portable device. The method further includes receiving, from the remote computing device, location data corresponding to a current location of the vehicle, and estimating the location of the contained portable device based on the location data from the remote computing device.

DETAILED DESCRIPTION

Overview

Figure 1:
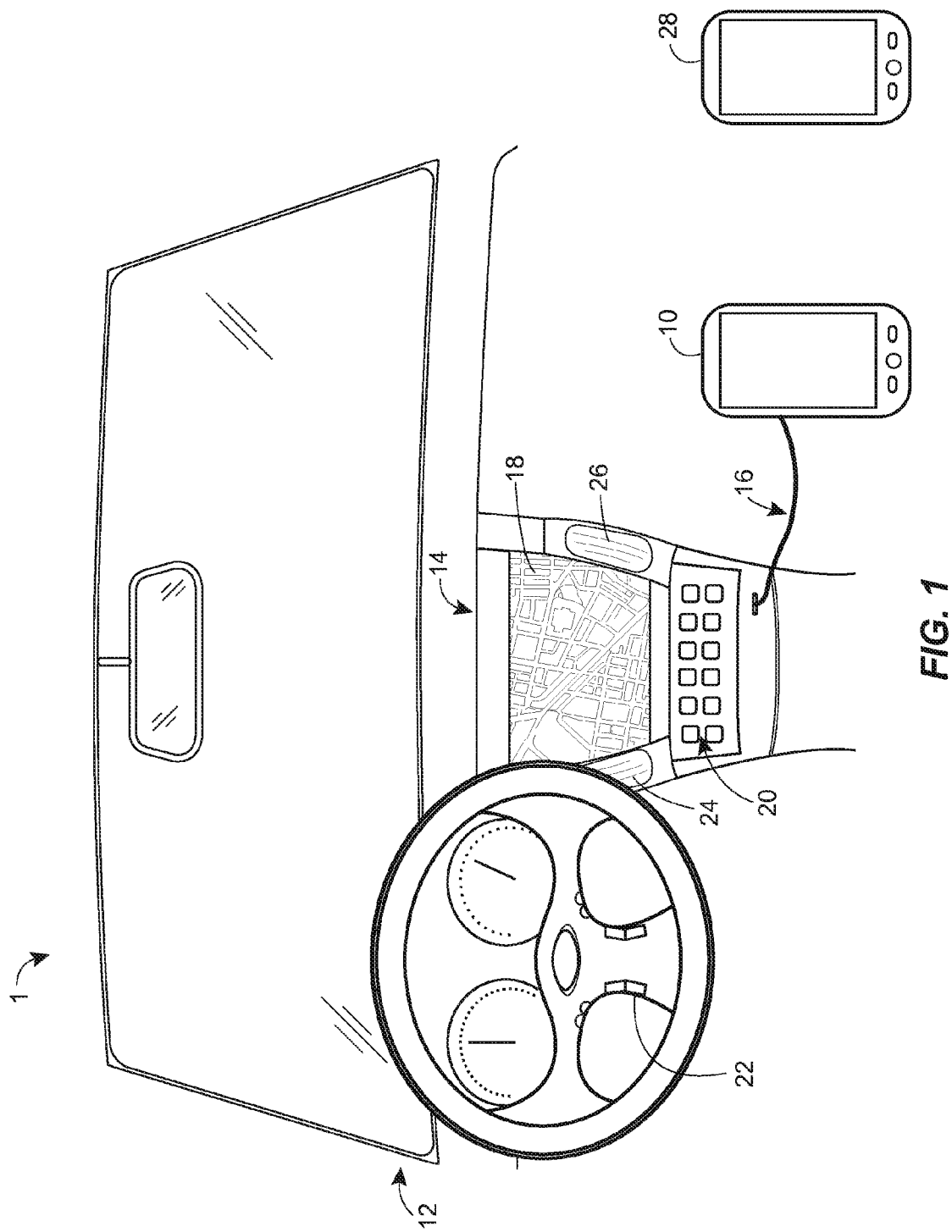
FIG. 1 illustrates an example vehicle in which the techniques of the present disclosure can be used to determine the location of a portable device in the vehicle.

Generally speaking, the techniques of this disclosure allow a portable device such as a smartphone to determine its current geographic location using the geo-location technology implemented in a vehicle, so as to take advantage of the sensors of the vehicle. In the discussion below, a portable device in direct communication with the head unit can be referred to as an "attached portable device," and a portable device that operates within the vehicle but is not in direct communication with the head unit can be referred to as a "contained portable device."

The contained portable device can detect a nearby attached portable device communicatively connected to a vehicle head unit (also referred to herein as "a head unit," "a computing device embedded within a vehicle," or "an embedded computing device"), receive the location of the vehicle via a wired or wireless short-range communication link, and estimate the location of the contained portable device based on the received location of the vehicle. In this manner, the contained portable device can preserve battery power by not activating its own Global Positioning Service (GPS) or other positioning module. Moreover, in some cases the contained portable device may not be able to receive any signals from remote sources such as satellites, cellular towers, Wireless Local Area Network (WLAN) hotspots, etc., whereas the head unit may estimate the vehicle's position using dead reckoning and/or other suitable techniques and the attached portable device may provide the positioning data to the contained portable device via the short-range communication link.

In some implementations, the contained portable device may request positioning information from an attached portable device via a short-range communication link. In turn, the attached portable device may receive positioning information from the head unit via another short-range communication link. Thus, a portable device that is not authorized to communicate with the head unit directly (such as the smartphone of a passenger in the vehicle) can obtain positioning data from the portable that is authorized to communicate with the head unit directly (such as the smartphone of the driver).

In other implementations, the contained portable device may determine that the attached portable device is operating nearby (using proximity sensing, for example) and request positioning information from a location relay server, via a long-range communication network. The location relay server can determine whether the user of the attached portable device configured the attached portable device to provide positioning information to proximate portable devices, and cause the attached portable device to provide positioning information to the contained portable device or forward the positioning data from the attached portable device to the contained portable device.

The location relay server in some of these implementations can store positioning data for portable devices in a database, and provide the positioning data to requesting devices. In at least some of the embodiments, a user of the portable device whose location the location relay server stores in a database, or the driver of the vehicle whose location the location relay server stores in the database, operates certain controls on a web site or another software application, or installs certain software, to allow the location relay server to provide positioning information to other devices.

Further, when the location relay server receives a request from a contained portable device including an identifier of a co-located peer portable device, the location relay service also can check whether the stored positioning information is up-to-date. For example, the location relay server may determine that the positioning information for a certain portable device is less than five minutes old, and therefore can be considered up-to-date. Otherwise, the location relay server may transmit a request for updated positioning information to the peer portable device to transmit updated positioning information.

Example Hardware and Software Components

Referring to FIG. 1, an example environment 1 in which the techniques outlined above can be implemented includes an attached portable device 10, a contained portable device 28, and a vehicle 12 with a head unit 14. The attached portable device 10 may be a smart phone, a tablet computer, a laptop computer, or a wearable computing device, for example. Moreover, the contained portable device 28 may also be a smart phone, a tablet computer, a laptop computer, or a wearable device, for example. The attached portable device 10 communicates with the head unit 14 of the vehicle 12 via a short-range communication link 16, which may be wired (e.g., wired Universal Serial Bus (USB)) or wireless (e.g., Bluetooth, Wi-Fi Direct, wireless USB). The attached portable device 10 also can communicate with various content providers, servers, etc. via a wireless long-range communication network such as a fourth- or third-generation cellular network (4G or 3G, respectively) and/or the Internet. Further, the attached portable device 10 may communicate with the contained portable device 28 via another short-range communication link (not shown) which may be for example, Bluetooth, Wi-Fi Direct, ZigBee, etc. In some embodiments, the short-range communication link 16 and the other short-range communication link (not shown) may be a portion of the same short-range communication network. In other embodiments, the two short-range communication links may each be a portion of different short-range communication networks. The contained portable device 28 may also communicate with various content providers, servers, etc. via a wireless long-range communication network such as a fourth- or third-generation cellular network (4G or 3G, respectively) and/or the Internet.

The head unit 14 can include a display 18 for presenting geographic data such as a digital map or navigation information. The display 18 in some implementations is a touchscreen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting geographic data. The head unit 14 also can include audio input and output components such as a microphone 24 and speakers 26, for example. Moreover, the head unit 14 can communicate with various content providers, servers, etc. via a wireless long-range communication network such as a fourth- or third-generation cellular network (4G or 3G, respectively) and/or the Internet.

Figure 2:
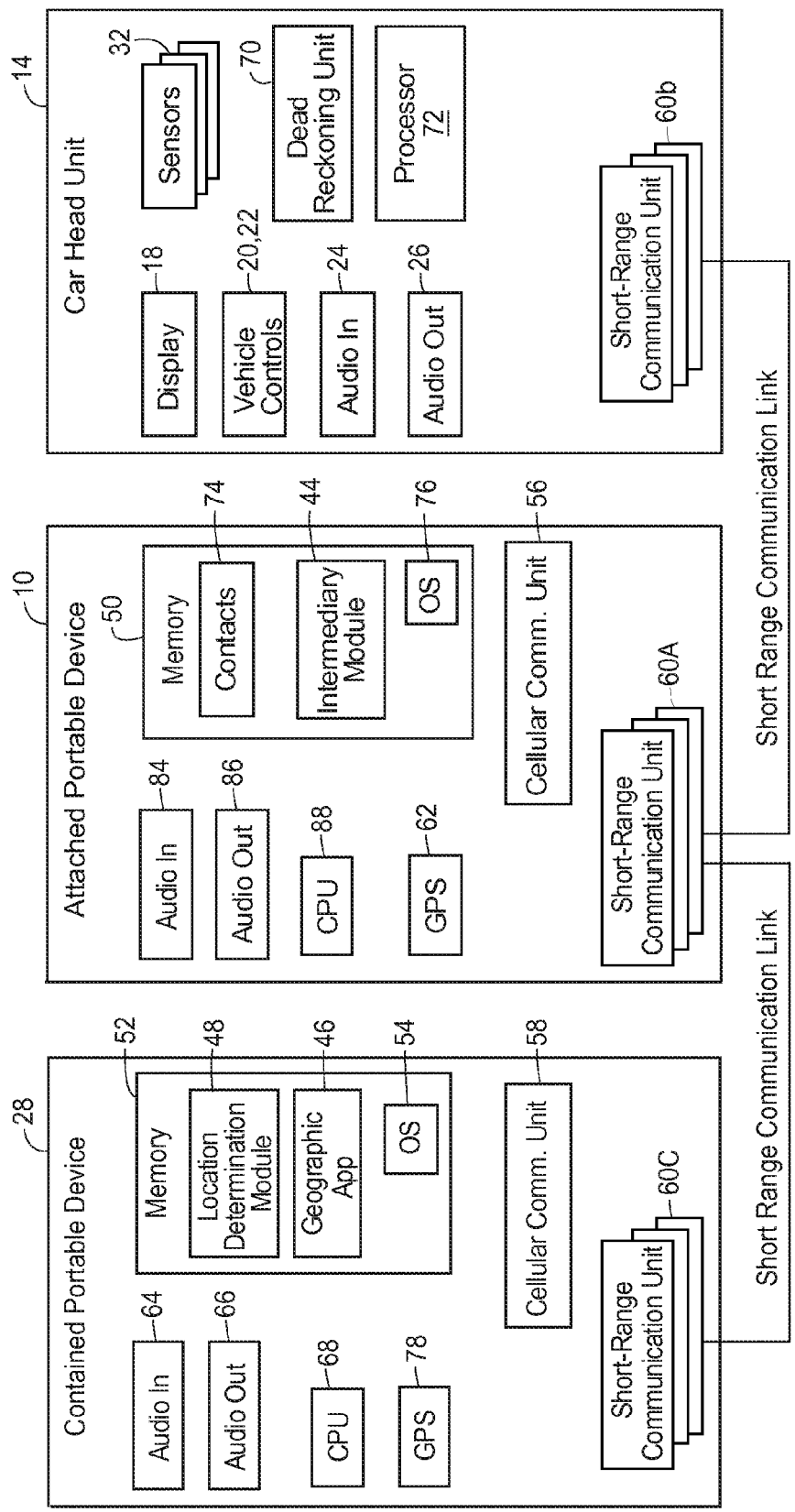
FIG. 2 is a block diagram of an example communication system in which the attached portable device, the contained portable device, and the head unit of FIG. 1 can operate.

An example implementation of the attached portable device 10, the connected portable device 28 and the head unit 14 is discussed next with reference to FIG. 2. As discussed above, the head unit 14 can include a display 18, hardware controls 20, 22, an audio input unit 24, and an audio output unit 26. The head unit also can include a processor 72, a set of one or several sensors 32, a dead reckoning unit 70 and one or several short-range communication units 60B.

The set of sensors 32 can include, for example, a GPS module to determine the current location of the vehicle in which the head unit 14 is installed, an inertial measurement unit (IMU) to measure the speed, acceleration, wheel rotation, and current orientation of the vehicle, a device to determine whether or not the turn signal has been pushed up or down, etc. Although FIG. 2 depicts the set of sensors inside the head unit 14, it is noted that the sensors 32 need not be integral components of the head unit 14. Rather, a vehicle can include any number of sensors in various locations, and the head unit 14 can receive data from these sensors during operation. In operation, the sensors 28 can be used for determining the state of the vehicle 12.

While the current location of the vehicle may be determined by the GPS module, in some embodiments, the current location may additionally or alternatively be determined offline by the dead reckoning unit 70 (e.g., when the head unit 14 cannot receive a signal from a GPS satellite or other positioning module, or the signal is of poor quality). The dead reckoning unit 70 may receive data from the set of sensors 32, for example including the speed which may be derived from the rotation of the wheels, the current orientation of the vehicle, a previous location, and the time in which the previous location was determined. The sensor data may then be analyzed by the dead reckoning unit to determine the current location of the vehicle. The dead reckoning unit 70 may then determine the vehicle's latitude, longitude, elevation, etc., based on this determination. In other embodiments, the dead reckoning unit 70 may send the sensor data to the attached portable device 10, and the attached portable device 10 may determine the current location of the vehicle based on the sensor data.

A short-range communication unit 60B allows the head unit 14 to communicate with the attached portable device 10. The short-range communication unit 60B may support wired or wireless communications, such as USB, Bluetooth, Wi-Fi Direct, etc.

The processor 72 can operate to format messages transmitted between the head unit 14 and the attached portable device 10, process data from the sensors 32 and the audio input 24, display map images via the display 18, play audio instructions via the audio output, etc.

Additionally, the attached portable device 10 can include a short-range communication unit 60A for communicating with the head unit 14 via a short-range communication link, and also for communicating with the contained portable device 28 via another short-range communication link. Similar to the unit 60B, the short-range communication unit 60A can support one or more communication schemes such as USB, Bluetooth, Wi-Fi Direct, etc. In some embodiments, the attached portable device 10 can communicate with the head unit 14 using one communication scheme, and can communicate with the contained portable device 28 using another communication scheme. Alternatively, the attached portable device 10 can communicate with both the head unit 14 and the contained portable device 28 using the same communication scheme. The attached portable device 10 can include audio input and output components such as a microphone 84 and speakers 86. Additionally, the attached portable device 10 includes one or more processors or CPUs 88, a GPS module 62, a memory 50, and a cellular communication unit 56 to transmit and receive data via a 3G cellular network, a 4G cellular network, or any other suitable network. The attached portable device 10 can also include additional sensors (e.g., an accelerometer, a gyrometer) or, conversely, the attached portable device 10 can rely on sensor data supplied by the head unit 14. In one implementation, to improve accuracy during real-time navigation, the attached portable device 10 relies on the location data supplied by the head unit 14 rather than on the output of the GPS module 62.

The memory 50 can store, for example, contacts 74 and other personal data of the driver. As illustrated in FIG. 2, the memory also can store instructions of an operating system 76, and an intermediary module 44. The intermediary module 44 can act as an intermediary between the contained portable device 28 and the head unit 14, when the contained portable device 28 transmits a positioning request in order to determine the location of the contained portable device 28. For example, the contained portable device 28 may communicate a positioning request to the attached portable device 10 via the short-range communication link. The attached portable device 10 may then transmit a request for location data to the head unit 14 via the other short-range communication link, and in turn, may receive the current location of the vehicle or may receive sensor data, as described above, for calculating the current location of the vehicle. When the attached portable device 10 receives sensor data, the attached portable device 10 may determine the current location of the vehicle based on the sensor data using dead reckoning techniques. In any event, the attached portable device 10 may then transmit the current location of the vehicle to the contained portable device 28.

The software components 44, and 76 can include compiled instructions and/or instructions in any suitable programming language interpretable at runtime. In any case, the software components 44, and 76 execute on the one or more processors 88.

Further, the contained portable device 28 can include a short-range communication unit 60C for communicating with the attached portable device 10 via the short-range communication link. Similar to the unit 60A, the short-range communication unit 60C can support one or more communication schemes such as USB, Bluetooth, Wi-Fi Direct, etc. In some embodiments, the contained portable device 28 may be out of the range of the short-range communication network including the head unit 14, or may not be able to directly communicate with the head unit 14 for some other reason (e.g., the network is password protected, the contained portable device is not authorized to communicate with the head unit such as a passenger's smartphone in the vehicle, the connection is of poor quality, etc.). The contained portable device 28 can include audio input and output components such as a microphone 64 and speakers 66. Additionally, similar to the attached portable device 10, the contained portable device 28 includes one or more processors or CPUs 68, a GPS module 78, a memory 52, and a cellular communication unit 58 to transmit and receive data via a 3G cellular network, a 4G cellular network, or any other suitable network. The contained portable device 28 can also include additional sensors (e.g., an accelerometer, a gyrometer, ultrasonic sensors, an infrared transceiver, RFID).

The memory 52 can store instructions of an operating system 54, a geographic application 46 and a location determination module 48. The geographic application 46 may include map data (e.g., in a vector format) including offline map data, navigation data including directions from an origin to a destination, traffic data, etc. The location determination module 48 may determine the location of the contained portable device 28 using location data from the attached portable device 10 rather than relying on the output of the GPS module 78. In some embodiments, the location determination module 48 may also determine the location of the contained portable device 28 when the contained portable device 28 cannot receive signals from remote sources such as satellites, cellular towers, WLAN hotspots, etc., or the received signals are of poor quality.

For example, the location determination module 48 may detect the attached portable device 10 using proximity sensors disposed within the contained portable device 28.

More specifically, the location determination module 48 may identify a nearby object using ultrasonic sensors (e.g., objects within five meters of the contained portable device 28), and may identify a MAC address corresponding to the attached portable device. In other embodiments, the location determination may detect the attached portable device 10 using infrared signals, radio frequency identification (RFID), etc. In yet other embodiments, the location determination module 48 may detect the attached portable device 10 by detecting a radio signal such as a Bluetooth signal from the attached portable device 10 and determining the distance based on the received signal strength (RSS) of the Bluetooth signal. The location determination module 48 may also detect the attached portable device 10, for example via a short-range communication network, and may communicate with the attached portable device 10 via the short-range communication link. In an alternative embodiment, the attached portable device 10 may continuously broadcast the current location of the vehicle to devices within the vehicle. The contained portable device 28 may detect the attached portable device 10 by receiving the broadcast message and may also receive the current location of the vehicle.

In any event, the location determination module 48 may transmit a positioning request to the attached portable device 10. The attached portable device 10 may then transmit a request for location data to the head unit 14 via the other short-range communication link. As mentioned above, the location determination module 48 may receive the current location of the vehicle as determined by the attached portable device 10 or the head unit 14 and may estimate the current location of the contained portable device 28 based on the current location of the vehicle. Thus, the contained portable device 28 which is not authorized to communicate with the head unit 14 directly may receive the current location of the vehicle from the attached portable device 10 which is authorized to communicate with the head unit 14 directly.

In an exemplary scenario, John Doe is a passenger in a vehicle which has a smart phone attached to the head unit. When the vehicle is in a large tunnel, John would like to know his location to receive navigation directions to a nearby gas station, while the attached phone receives directions to a motel. While in the tunnel, the head unit determines the current location of the vehicle using dead reckoning based on the previous GPS location of the vehicle before the vehicle entered the tunnel, and the speed and direction of the vehicle. To navigate to the nearest gas station, John Doe's contained smart phone detects the attached smart phone, but cannot directly communicate with the head unit. Instead, John's contained smart phone requests the current location of the vehicle from the attached smart phone, and estimates the current location of John's contained smart phone based on the location of the vehicle. Additionally, John's contained smart phone accesses offline map data stored in the contained smart phone to locate a nearby gas station, and generates directions from the estimated current location to the nearby gas station.

It should be understood that the current location of the vehicle may be determined while the contained smart phone is unable to connect to a long-range communication network such as the Internet. It should also be understood that while the above examples describe determining the location of a contained portable device for navigation directions, the location of the contained portable device may be used for locating the contained portable device on a map, for determining the distance between the contained portable device and a second location, for determining local traffic conditions, for determining local weather data, or for any other suitable purpose.

Figure 3:
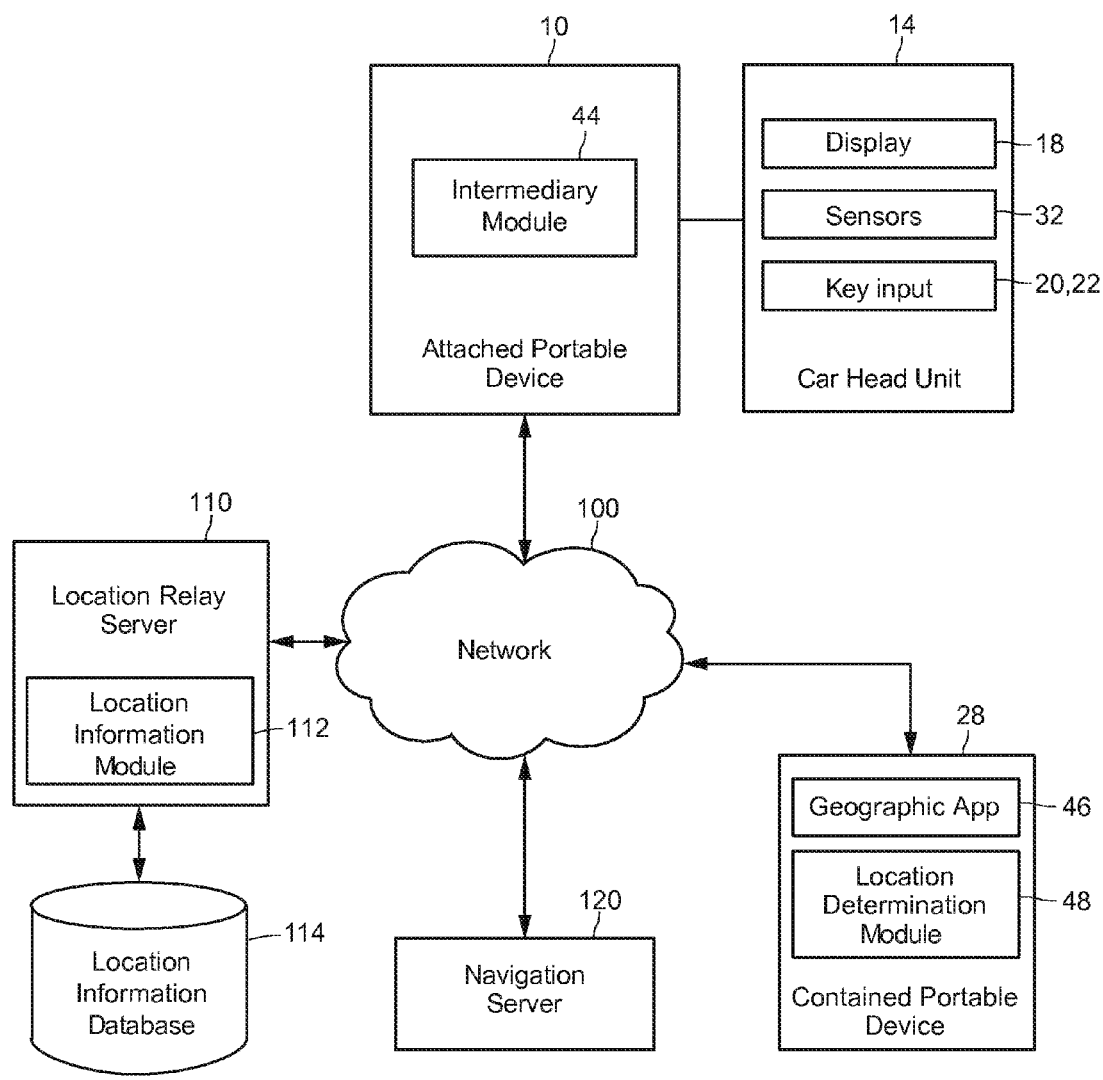
FIG. 3 is a block diagram of an example attached portable device, an example contained portable device, and an example head unit that can operate in the system of FIG. 1.

FIG. 3 illustrates an example communication system in which the contained portable device 28 can operate to obtain location data. For ease of illustration, the attached portable device 10, the contained portable device 28 and the head unit 14 are illustrated in a FIG. 3 in a simplified manner, i.e., without some of the components as illustrated in FIG. 2 and/or discussed elsewhere in this disclosure.

The attached portable device 10, the contained portable device 28, and the head unit 14 have access to a wide area communication network 100 such as the Internet via a long-range wireless communication link (e.g., a cellular link). In the example configuration of FIG. 3, the attached portable device 10, the contained portable device 28, and/or the head unit 14 communicate with a navigation server 120 that provides navigation data and map data, and a location relay server 110 that stores location data for attached portable devices.

More generally, the attached portable device 10 and the contained portable device 28 can communicate with any number of suitable servers. For example, in another embodiment, the navigation server 54 provides directions and other navigation data while a separate map server provides map data (e.g., in a vector graphics format), a traffic data server provides traffic updates along the route, a weather data server provides weather data and/or alerts, etc. In the embodiments described with respect to FIG. 3, the contained portable device 28, the attached portable device 10, and the head unit 14 may be able to connect to the wide area communication network 100.

The location relay server 110 may receive location data from the attached portable device 10 including (i) identification information for the attached portable device 10 (e.g., a MAC address), (ii) the current location of the vehicle, (iii) a time stamp indicating when the current location was determined and/or (iv) accuracy data. The location relay server 110 may store the location data for several attached portable devices in a location information database 114. It should be understood that the location relay server 110 receives authorization and/or confirmation via user controls, from users of the portable devices or vehicle drivers whose locations are stored in the location information database 114. In some embodiments, when the vehicle is in motion, the attached portable devices may transmit updated location data to the location relay server 110 periodically, e.g., every second, every minute, every hour, etc.

Additionally, the location relay server 110 may request updated location data from the attached portable device 10. For example, the location determination module 48 in the contained portable device 28 may request location data from the location relay server 110 and may transmit identification information for the nearby attached portable device 10. The location information module 112 in the location relay server 110 may then compare the identification information to identification information in the location information database 114 to find if there is a match.

If there is a match, the location information module 112 identifies the current location and the time stamp stored for the matching attached portable device and determines whether the current location is up-to-date. For example, the location information module 112 may compare the time stamp to a threshold expiration, and if, for example, the time stamp is more than five minutes old, the location information module 112 may determine the current location is not up-to-date. If there is no match or the current location is not up-to-date, the location information module 112 may transmit a request (e.g., via a push notification) to the attached portable device 10 for updated location data. Upon receiving the updated location data, the location information module 112 may store the updated location data as current location data in the location information database 114. The location information module 112 may then transmit the current location and time stamp to the location determination module 48 of the contained portable device 28.

In some embodiments, the contained portable device 28 may detect more than one attached portable device. The location relay server 110 may then transmit the current location data for multiple attached portable devices to the contained portable device 28. Moreover, the contained portable device 28 may estimate its own location based on the current location data for multiple attached portable devices.

Figure 4:
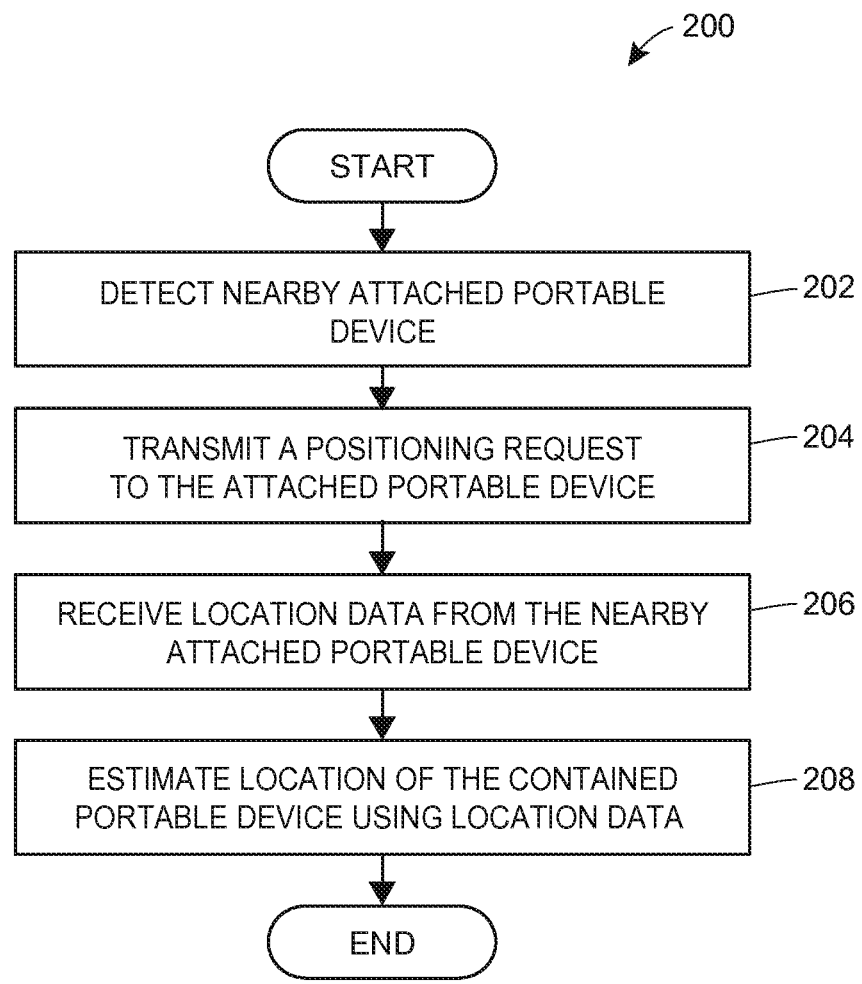
FIG. 4 is a flow diagram of an example method for determining the location of the contained portable device, which can be implemented in the contained portable device of FIG. 2.

Now referring to FIG. 4, an example method 200 for determining the location of the contained portable device 28 by the location determination module 48 (or another suitable system) is shown. The method can be implemented in a set of instructions stored on a computer-readable memory and executable on one or more processors of the contained portable device 28, for example.

At block 202, the location determination module 48 detects a nearby attached portable device such as the attached portable device 10. In some embodiments, the location determination module 48 may detect multiple nearby attached portable devices. For example, objects within a threshold distance, e.g., five meters, of the location determination module 48 may be detected by ultrasonic sensors, RFID, radio signals, infrared signals, etc. The location determination module 48 may identify the objects based on corresponding MAC addresses.

Then, at block 204, a positioning request may be transmitted to the attached portable device via a short-range communication link. The attached portable device may then transmit a request for location data to the embedded computing device via another short-range communication link belonging to a same or different short-range communication network. In other embodiments, the positioning request may be transmitted to a remote server such as the location relay server 110 of FIG. 3, which stores location data for portable devices.

In any event, at block 206, location data for the nearby attached portable device(s) may be received. The location data may include the current location of the vehicle, a time stamp indicating when the current location was determined, identification information for the attached portable device, accuracy data indicating a level of accuracy in which the current location was determined, etc.

In some embodiments, the embedded computing device may transmit the location data which may include vehicle sensor data to the attached portable device which, in turn, may generate and transmit a current location of the vehicle and/or the location data to the location determination module 48. In other embodiments, the location data may be transmitted from the remote server. When the location data is transmitted by the remote server, the remote server may determine whether the location data is up-to-date based on the time stamp corresponding to the location data. If the location data is not up-to-date, the remote server may request updated location data from the attached portable device, and may transmit the updated location data to the location determination module 48.

The location of the contained portable device 28 may then be estimated based on the received location data (block 208). For example, the location determination module 48 may estimate the location of the contained portable device 28 as the current location of the vehicle. The estimated location may be displayed on a user interface on the contained portable device 28, for example, in a mapping application. The user interface may display map data including an indication of the estimated location and/or navigation directions from the estimated location to another location. In some scenarios, the estimated location may be utilized by the contained portable device 28 to determine nearby points of interest (POIs), cities, etc.

Figure 5:
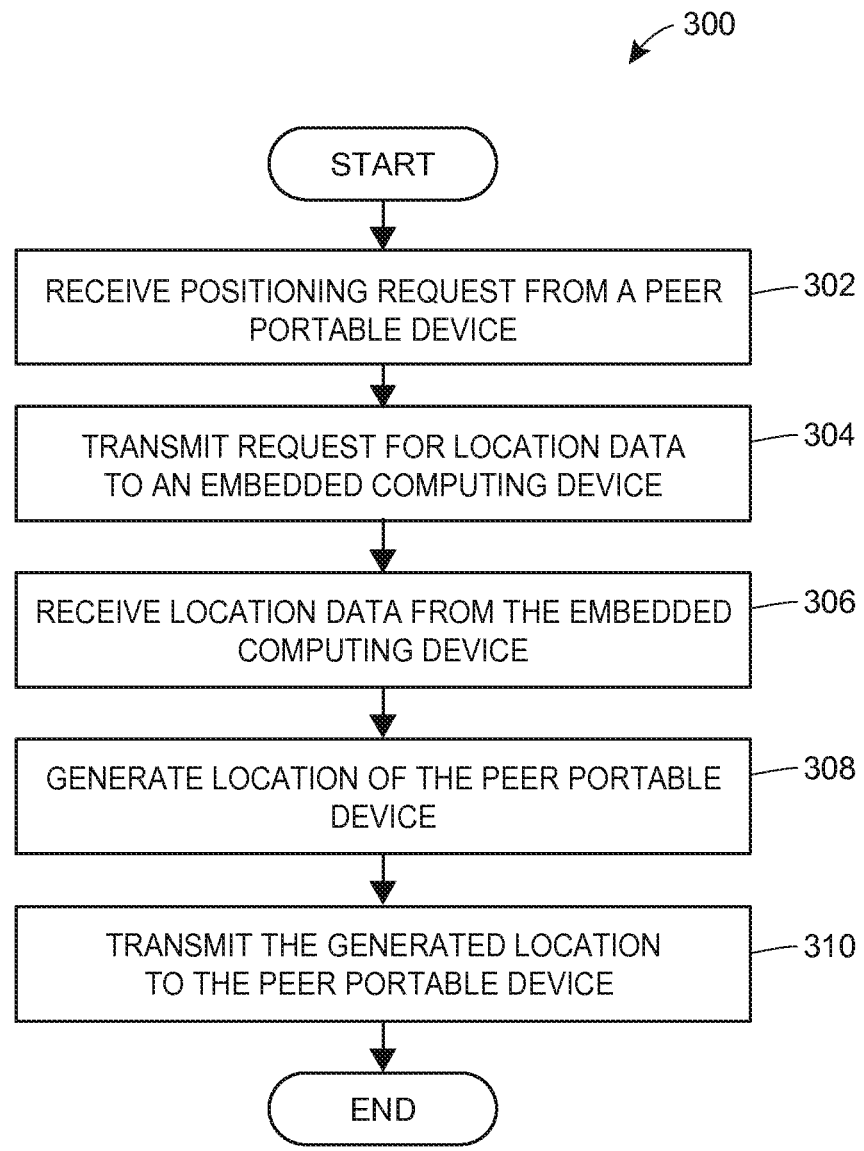
FIG. 5 is a flow diagram of an example method for enabling indirect communication between the contained portable device and the head unit, which can be implemented in the attached portable device of FIG. 2.

FIG. 5 illustrates a flow diagram of an example method 300 for enabling indirect communication between the contained portable device 28 and the head unit 14 by the intermediary module 44 (or another suitable system). The method can be implemented in a set of instructions stored on a computer-readable memory and executable on one or more processors of the attached portable device 10, for example.

At block 302, the intermediary module 44 may receive a positioning request from a peer portable device such as the contained portable device 28. The request may be received over a short-range communication link such as USB, Bluetooth, Wi-Fi Direct, etc. The intermediary module 44 may then transmit a request for location data to a computing device embedded within a vehicle such as the head unit 14 (block 304) via another short-range communication link belonging to a same or different short-range communication network as the other short-range communication link. In some embodiments, the contained portable device 28 may not be authorized to communicate directly with the head unit 14.

At block 306, the intermediary module 44 may receive the location data from the embedded computing device. The location data may include the current location of the vehicle based on GPS data and/or dead reckoning performed by the head unit. Alternatively, the location data may include vehicle sensor data such as a previous location of the vehicle, the time at which the previous location was determined, direction data, speed data, etc. The intermediary module 44 may then generate the current location of the vehicle and/or the peer portable device based on the location data (block 308). For example, the current location may be generated based on the vehicle sensor data using dead reckoning techniques. Moreover, the current location of the peer portable device may be generated by adjusting the location data by the distance between the peer portable device and the embedded computing device, for example, two meters. In any event, the intermediary module 44 may transmit the generated location to the peer portable device (block 310).

Figure 6:
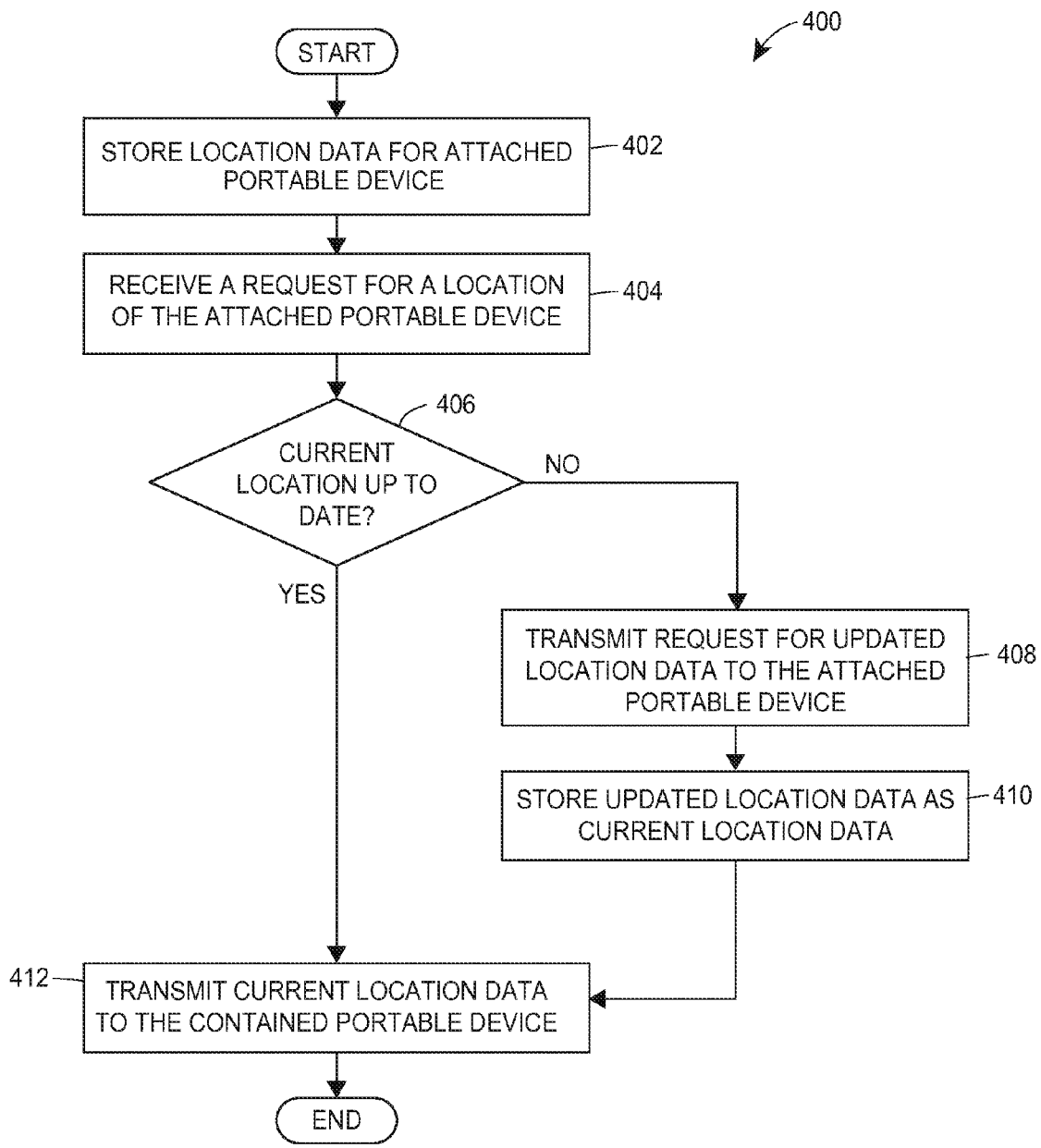
FIG. 6 is a flow diagram of an example method for transmitting the location of the head unit, which can be implemented in the location relay server of FIG. 3.

FIG. 6 illustrates a flow diagram of an example method 400 for transmitting the location of the head unit to the contained portable device 28, by the location information module 60 (or another suitable system). The method can be implemented in a set of instructions stored on a computer-readable memory and executable on one or more processors of the location relay server 110, for example.

The location information module 112 may receive location data for one or several attached portable devices, after a user or driver authorizes the location information module 112 to receive location data. In some embodiments, the attached portable devices may periodically transmit location data determined by GPS modules and/or dead reckoning. For example, the location data may be transmitted when a vehicle is moving every second, every minute, every several minutes, etc.

The location data for an attached portable device may include identification information for the attached portable device such as a MAC address, the current location of the vehicle connected to the attached portable device, a time stamp indicating when the current location was determined, accuracy data indicating a level of accuracy in which the current location was determined, etc. At block 402, the location information module 112 may store the location data for one or several portable devices. The location information module 112 may then receive a request for a location of an attached portable device and/or an indication of the attached portable device via a communication network (block 404). For example, the contained portable device may transmit a MAC address of the nearby attached portable device along with the request.

The location information module 112 may then look up the attached portable device, for example, in a location information database 114 to determine whether there is a match. If there is a match, the location information module 112 may compare the time stamp for the attached portable device to a threshold expiration. If there is no match or the current location is expired, a request for updated location data may be transmitted to the attached portable device (block 408). Upon receiving location data from the attached portable device, the location information module 112 may store the updated location data as current location data in the location information database 114 (block 410). The current location data may then be transmitted to the contained portable device 28 (block 412).

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 200, 300, and 400 may include one or more function blocks, modules, individual functions or routines in the form of tangible computer-executable instructions that are stored in a non-transitory computer-readable storage medium and executed using a processor of a computing device (e.g., a server, a personal computer, a smart phone, a contained portable device, an attached portable device, a vehicle head unit, a tablet computer, a head mounted display, a smart watch, a mobile computing device, or other personal computing device, as described herein). The methods 200, 300, and 400 may be included as part of any backend server (e.g., a location relay server, or any other type of server computing device, as described herein), attached portable device modules, contained portable device modules, or vehicle head unit modules of the example environment, for example, or as part of a module that is external to such an environment. Though the figures may be described with reference to the other figures for ease of explanation, the methods 200, 300, and 400 can be utilized with other objects and user interfaces. Furthermore, although the explanation above describes steps of the methods 200, 300, and 400 being performed by specific devices (such as an attached portable device 10, a contained portable device 28, a location relay server 110, and a vehicle head unit 14), this is done for illustration purposes only. The blocks of the methods 200, 300, and 400 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for sharing location data with portable devices within a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A portable device comprising:
a communication interface to communicate with a peer portable device and a computing device embedded within a vehicle and via a first short-range communication link and a second short-range communication link, respectively;
one or more processors coupled to the communication interface; and
a non-transitory computer-readable memory coupled to the one or more processors and storing thereon instructions that, when executed by the one or more processors, cause the portable device to:
receive a positioning request from the peer portable device via the first short-range communication link,
transmit a request for location data to the embedded computing device via the second short-range communication link,
receive, from the embedded computing device via the second short-range communication link, location data corresponding to a current location of the vehicle;
generate an indication of a location of the peer portable device using the location data corresponding to the current location of the vehicle, and
transmit the indication of the location of the peer portable device to the peer portable device via the first short-range communication link.

2. The portable device of claim 1, wherein:
the location data includes vehicle sensor data; and
to generate an indication of a location of the peer portable device using the location data corresponding to the current location of the vehicle, the instructions further cause the portable device to determine the current location of the vehicle based on the vehicle sensor data.

3. The portable device of claim 2, wherein the vehicle sensor data includes at least one of:
a previous location of the vehicle,
a time at which the previous location was determined,
a direction of travel for the vehicle, or
a speed of the vehicle.

4. The portable device of claim 1, wherein location data includes the current location of the vehicle and an indication of when the current location of the vehicle was determined.

5. The portable device of claim 4, wherein the current location is based on at least one of: (i) positioning signals received at the embedded computing device or (ii) dead reckoning.

6. The portable device of claim 1, wherein the peer portable device is not authorized or is unable to directly communicate with the embedded computing device.

7. A method for determining a location of a portable device, the method comprising:
determining, by one or more processors in a contained portable device, that the contained portable device is within a threshold distance of an attached portable device communicatively coupled to a computing device embedded within a vehicle, wherein the contained portable device communicates with the attached portable device via a first short-range communication link, and the embedded computing device communicates with the attached portable device via a second short-range communication link;
transmitting, by the one or more processors to the attached portable device, a positioning request via the first short-range communication link;

receiving, at the one or more processors, location data corresponding to a current location of the vehicle from the attached portable device; and estimating, by the one or more processors, the location of the contained portable device based on the location data corresponding to the current location of the vehicle.

8. The method of claim 7, wherein receiving location data corresponding to a current location of the vehicle from the embedded computing device comprises:

receiving, at the one or more processors, the current location of the vehicle from the attached portable device, wherein the attached portable device receives the location data from the embedded computing device.

9. The method of claim 7, wherein location data corresponding to a current location of the vehicle includes the current location of the vehicle, and an indication of when the current location of the vehicle was determined.

10. The method of claim 7, wherein the current location of the vehicle is based on at least one of: (i) positioning signals received at the embedded computing device or (ii) dead reckoning.

11. The method of claim 7, further comprising:

upon receiving an update to the location data at the embedded computing device, receiving, at the one or more processors, the updated location data from the attached portable device; and estimating, by the one or more processors, the location of the portable device based on the updated location data from the attached portable device.

12. The method of claim 11, wherein the updated location data is received at least when the current location of the vehicle device was determined before a threshold expiration.

13. The method of claim 7, further comprising:

storing, by the one or more processors, offline map data; and displaying, by the one or more processors, at least some of the offline map data including the estimated location of the contained portable device.

14. The method of claim 7, wherein the contained portable device is not authorized or is unable to directly communicate with the embedded computing device.

15. A method for determining a location of a portable device, the method comprising:

determining, by one or more processors in a contained portable device, that the contained portable device is within a threshold distance of an attached portable device communicatively coupled to a computing device embedded within a vehicle, transmitting, by the one or more processors to a remote computing device, a positioning request for a location of the attached portable device corresponding to a current location of the vehicle;

receiving, at the one or more processors from the remote computing device, location data for the attached portable device corresponding to the current location of the vehicle; and estimating, by the one or more processors, the location of the contained portable device based on the location data from the remote computing device corresponding to the current location of the vehicle.

16. The method of claim 15, wherein receiving location data for the attached portable device comprises:

receiving, at the one or more processors from the remote computing device, the current location of the vehicle; and receiving, at the one or more processors from the remote computing device, an indication of when the current location of the vehicle was determined.

17. The method of claim 16, wherein the updated location data is received at least when the current location for the attached portable device was determined before a threshold expiration.

18. The method of claim 15, further comprising:

upon receiving an update to the location data at the remote computing device, receiving, at the one or more processors, the updated location data for the attached portable device; and estimating, by the one or more processors, the location of the portable device based on the updated location data for the attached portable device.

19. The method of claim 15, wherein transmitting a positioning request for a location of the attached portable device comprises:

transmitting, by the one or more processors to the remote computing device, a positioning request for respective locations of a plurality of attached portable devices; and receiving, at the one or more processors from the remote computing device, location data corresponding to a plurality of current locations of the plurality of attached portable devices.

20. The method of claim 15, wherein the contained portable device is not authorized or is unable to directly communicate with the embedded computing device.

* * * * *